US009235392B2

(12) United States Patent
Dally

(10) Patent No.: US 9,235,392 B2
(45) Date of Patent: Jan. 12, 2016

(54) SYSTEM, METHOD, AND COMPUTER PROGRAM PRODUCT FOR IMPROVED POWER EFFICIENCY DURING PROGRAM CODE EXECUTION

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 5 days.

(21) Appl. No.: 14/161,617

(22) Filed: Jan. 22, 2014

(65) Prior Publication Data

US 2015/0205589 A1 Jul. 23, 2015

(51) Int. Cl.
*G06F 9/44* (2006.01)
*G06F 9/45* (2006.01)

(52) U.S. Cl.
CPC .................................. *G06F 8/4432* (2013.01)

(58) Field of Classification Search
None
See application file for complete search history.

(56) References Cited

U.S. PATENT DOCUMENTS

| | | | | |
|---|---|---|---|---|
| 6,964,029 | B2 * | 11/2005 | Poznanovic et al. | 716/105 |
| 2004/0133555 | A1 * | 7/2004 | Toong et al. | 707/2 |
| 2009/0319458 | A1 * | 12/2009 | Minka et al. | 706/46 |
| 2013/0125087 | A1 * | 5/2013 | Trautmann | 717/104 |
| 2013/0159964 | A1 * | 6/2013 | Szpak | 717/105 |

OTHER PUBLICATIONS

"Profile-Guided Floating- to Fixed-Point Conversion for Hybrid FPGA-Processor Applications", Chen et al., ACM Transactions on Architecture and Code Optimization, vol. 9, No. 4, Article 43, Publication date: Jan. 2013.*
Chen et al., "Profile-Guided Floating- to Fixed-Point Conversion for Hybrid FPGA-Processor Applications," ACM Transactions on Architecture and Code Optimization, vol. 9, No. 4, Article 43, Jan. 2013, pp. 43:1-43:25.
Pool et al., "Precision Selection for Energy-Efficient Pixel Shaders," HPG 2011, Aug. 5-7, 2011, pp. 159-168.
Dally, W. J., "Micro-Optimization of Floating-Point Operations," ACM SIGARCH Computer Architecture News, vol. 17, Issue 2, Apr. 1989, pp. 283-289.
Dally, W. J., U.S. Appl. No. 14/161,628, filed Jan. 22, 2014.

* cited by examiner

*Primary Examiner* — Don Wong
*Assistant Examiner* — Daxin Wu
(74) *Attorney, Agent, or Firm* — Zilka-Kotab, PC

(57) ABSTRACT

A system, method, and computer program product are provided for compiling a computer program comprising arithmetic operations having different requirements with respect to numeric dynamic range, numeric resolution, or any combination thereof. The method comprises generating a transformed graph representation of the computer program by applying propagation rules that provide for relaxed numeric requirements, where applicable, and generating output code based on the transformed graph representation. Relaxing numeric requirements, such as dynamic range and resolution requirements, may advantageously lower power consumption during execution of the computer program.

20 Claims, 18 Drawing Sheets

|     |     | Data Type |     |     |       | Propagated Data Type |     |     |     |
| --- | --- | --- | --- | --- | --- | --- | --- | --- | --- |
| No. | Op  | Out | In1 | In2 | if    | O   | In1 | In2 | Name |
| 1   | ADD | +E* | +** | +** |       |     | +E* | +E* | Add Output Range |
| 2   | ADD | +*P | +** | +** |       |     | +*P | +*P | Add Output Precision |
| 3   | ADD |     | *E1* | *E2* | E1>E2 | *E1* |     |     | Add Input Range |
| 4   | ADD |     | *E1P | *E2* | E1>E2 | *E1P |     |     | Add Input Precision |
| 5   | MUL | **P |     |     |       |     | **P | **P | Mul Output Precision |
| 6   | MUL |     | **P |     |       | **P |     | **P | Mul Input Precision |
| 7   | MUL | *Eo* | *E1* |     | E2=Eo-E1 |     |     | *E2* | Mul Output Range |
| 8   | MUL |     | *E1* | *E2* | Eo=E1+E2 | *Eo* |     |     | Mul Input Range |

*Fig. 1C*

| Statement Number | Statement |
|---|---|
| 1 | `varying vec3 normal;` |
| 2 | `vec3 lightVec = vec3(light.position - position);` |
| 3 | `vec3 lightNorm = normalize(lightVec);` |
| 4 | `float lightDist = length(lightVec);` |
| 5 | `float atten = 1.0/`<br>`    ( light.constantAttenuation+`<br>`      lightDist*light.linearAttenuation+`<br>`      lightDist*lightDist*light.quadraticAttenuation);` |
| 6 | `vec3 diffuse = atten*`<br>`    vec3(light0.diffuse)*`<br>`    vec3(material.diffuse)*`<br>`    max(0.0,dot(lightNorm, normal));` |
| 7 | `vec3 specular = atten*`<br>`    vec3(light0.specular)*vec3(material.specular)*`<br>`    pow(max(0.0, dot(reflect(-lightNorm,`<br>`    normal),viewNorm),material.pow);` |
| 8 | `vec3 texture = vec3(texture2D(texture, texCoords));` |
| 9 | `gl_fragcolor = vec4(diffuse*texture + specular, 1.0);` |

*Fig. 6A*

| | | Floating-Point Operations | | | | | Corresponding Integer Operations | | | | |
|---|---|---|---|---|---|---|---|---|---|---|---|
| Statement Number | Statement | F* | F+ | FR | POW | SQRT | I24* | I12* | I24+ | I12+ | IR |
| 1 | normal | | | | | | | | | | |
| 2 | lightVec | | 3 | | | | | | | | |
| 3 | lightNorm | 6 | 2 | 1 | | 1 | | | | | |
| 4 | lightDist | | | | | | | | | | |
| 5 | atten | 3 | 2 | 1 | | | | 3 | | 2 | 1 |
| 6 | diffuse | 10 | 3 | | | | | 10 | | 3 | |
| 7 | specular | 16 | 8 | | 1 | | 10 | 6 | 7 | 1 | |
| 8 | texture | | | | | | | | | | |
| 9 | gl_fragcolor | 3 | 3 | | | | | 3 | | 3 | |
| | | | | | | | | | | | |
| | TOTAL | 38 | 21 | 2 | 1 | 1 | 10 | 22 | 7 | 9 | 1 |
| | Eop | 9 | 8 | | | | 4 | 1 | 0.6 | 0.3 | |
| | Savings | | | | | | 5 | 8 | 7.4 | 7.7 | |
| | Etype | 342 | 168 | 0 | | | 40 | 22 | 4.2 | 2.7 | |
| | Etot | 510 | | | | | | | | | |
| | Savings | | | | | | 50 | 176 | 51.8 | 69.3 | |
| | Total Savings | | | | | | 347 | 68% | | | |
| | Remaining | | | | | | 163 | 32% | | | |

*Fig. 6G*

SYSTEM, METHOD, AND COMPUTER PROGRAM PRODUCT FOR IMPROVED POWER EFFICIENCY DURING PROGRAM CODE EXECUTION

The present invention relates to computer systems, and more specifically to a system, method, and computer program product for improved power efficiency during program code execution.

BACKGROUND

A conventional processing unit, such as a graphics processing unit (GPU) or a central processing unit (CPU), typically provides floating-point arithmetic instructions having a large dynamic range and a large numeric resolution (precision) that are each more than sufficient to support a wide range of applications. For example, a GPU conventionally provides thirty-two bit floating-point arithmetic instructions that may be executed by a shader program to perform mathematical functions specified by the shader program. In general, a thirty-two hit floating-point arithmetic representation provides more than adequate dynamic range and numeric resolution. However, in many common scenarios shader programs are configured to generate data for display buffers comprising eight-hit to twelve-bit color channels that are conventionally used to drive display devices.

In such scenarios, thirty-two bit floating-point instructions are typically executed by the GPU to generate data associated with the color channels. A majority of bits associated with numeric resolution for resulting thirty-two bit floating-point data may be discarded because only eight bits or twelve bits of numeric resolution are actually required by each color channel. Furthermore, exponent bits associated with the thirty-two hit floating-point data may be discarded because the color channels are configured to operate within a narrow, predefined dynamic range. The process of computing unused data hits and subsequently discarding the unused data bits wastes power and results in lower overall GPU power efficiency. In other scenarios, GPUs often perform computations using normal vectors, three-component vectors whose vector magnitude is unity. Even though the individual components of these vectors may have high dynamic range, the exponent bits of each component may be discarded because the vector as a whole has limited dynamic range. Thus, there is a need for addressing this issue and/or other issues associated with the prior art.

SUMMARY

A system, method, and computer program product are provided for compiling a computer program comprising arithmetic operations having different requirements with respect to numeric dynamic range, numeric resolution, or any combination thereof. The method comprises generating an initial graph representation of arithmetic operations specified by ordered programming statements, annotating the initial graph representation with predefined attributes to produce a partially annotated graph representation, applying a set of propagation rules to each node within the partially annotated graph representation to produce a fully annotated graph representation, selecting numerical types for each edge within the fully annotated graph representation based on corresponding edge attributes to produce a transformed graph representation, and generating output code based on the transformed graph representation. Nodes within each graph representation correspond to arithmetic operations and edges within each graph representation correspond to data flow between the nodes.

BRIEF DESCRIPTION OF THE DRAWINGS

FIG. 1C is a table of propagation rules for transforming nodes within a data flow graph, in accordance with one embodiment;

FIG. 6A illustrates an exemplary input code listing that specifies a fragment shader program, in accordance with one embodiment;

FIG. 6G is a table illustrating relative power consumption of floating-point operations and corresponding integer operations associated with the fragment shader program of FIG. 6A, in accordance with one embodiment;

DETAILED DESCRIPTION

Figure 1A:
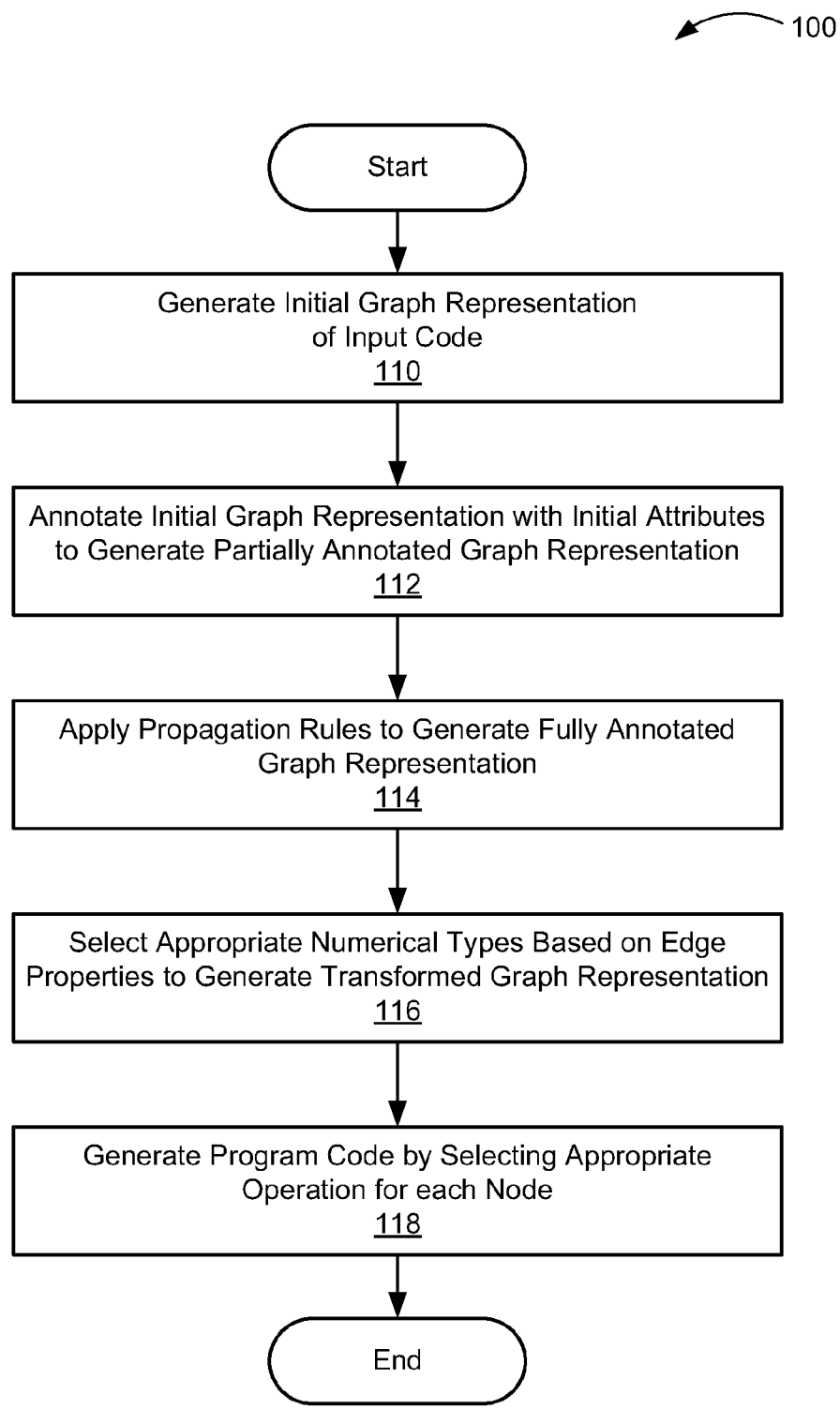
FIG. 1A illustrates a flow chart of a method for generating program code based on a graph representation and propagation rules, in accordance with one embodiment.

A technique is provided for transforming certain source arithmetic operations specified by a computer program to corresponding arithmetic operations configured to generate substantially identical arithmetic results and require less execution power. In one embodiment, each source arithmetic operation is specified as a floating-point operation, and each corresponding arithmetic operation is performed as an integer operation having equivalent or lower numeric resolution (precision). Performing a given arithmetic operation using a fixed-point representation rather than a floating-point representation may eliminate circuit switching activity associated with exponent calculations, resulting in relatively lower execution power. Similarly, performing an arithmetic operation at a lower resolution eliminates circuit switching activity associated with computing additional significant bits, resulting in relatively lower execution power. By transforming at least a portion of arithmetic instructions within the computer program from floating-point types to fixed-point operations or to lower-precision floating-point operations, overall execution power may be reduced.

In one embodiment, certain combined arithmetic operations are implemented within a processor to execute both a selected arithmetic operation and at least one selected casting operation in the same instruction. Combining the selected arithmetic operation and any associated casting operations into a single instruction eliminates the need to fetch and execute additional instructions associated with the associated casting operations, thereby improving execution efficiency. In other embodiments, casting instructions are implemented within the processor as distinct operations. In certain embodiments, both combined arithmetic operations and distinct casting operations are implemented within the processor.

In one embodiment, a compiler, such as a shader program compiler, is configured to identify which floating-point operations may be transformed to corresponding fixed-point integer operations. A set of propagation rules define which operations may be performed as fixed-point operations, based on dynamic range and numeric resolution requirements of each operation. For example, if a shade/program is configured to generate twelve-bit, fixed-point color channel results comprising a frame buffer output, then certain thirty-two-bit floating-point operations associated with computing the twelve-bit (or eight-bit) color channel results may be transformed to corresponding fixed-point integer operations.

In one embodiment, the compiler is configured to generate an executable object that targets an associated graphics processing unit (CPU). The executable object comprises binary instructions associated with an instruction set architecture (ISA) for the CPU. The compiler generates the executable object based on input code, such as source code written by a software engineer (e.g., programmer), and information that specifies required resolution for shader program results. The compiler may execute in conjunction with a CPU driver on a central processing unit (CPU) to generate the executable object for subsequent execution within the CPU. In an alternative embodiment, the compiler is configured to generate a binary object that is stored within a file comprising an application program. The binary object is then loaded into the CPU in conjunction with execution of the application program.

FIG. 1A illustrates a flow chart of a method 100 for generating program code based on a graph representation and propagation rules, in accordance with one embodiment. Although method 100 is described in conjunction with the systems of FIGS. 2-5A and 7, persons of ordinary skill in the art will understand that any system that performs method 100 is within the scope and spirit of embodiments of the present invention. Method 100 may be implemented as a compiler front-end, compiler subsystem, optimizer, or code generator in a software tool chain configured to generate code that targets a CPU, a CPU, a digital signal processor (DSP), or any other type of processing unit configured to execute floating-point instructions and integer instructions. In one embodiment, method 100 is implemented within the compiler.

Method 100 begins in step 110, where the compiler generates an initial graph representation of input code. The input code includes ordered programming statements that may reside within a memory or storage system and may be organized according to any technically feasible structure. For example, the input code may reside within a string data structure allocated within an application memory space. Alternatively, the input code may reside within a file associated with a file system. The input code may include, without limitation, high-level language constructs, low-level language constructs, machine code, or any combination thereof. The high-level language constructs may comprise statements including mathematical operations, statements that define program flow, statements comprising declarations, and the like. The statements may be syntactically compliant with a specific high-level computer language such as the well-known languages of C, C++, OpenGL, or OpenCL. The high-level language may also be a shader language such as GLSL or HLSL. The low-level language constructs may comprise abstract assembly statements, intermediate representation (IR) statements, or assembly language instructions associated with a specific ISA for a specific processing unit. In general, the initial graph representation of the input code may comprise an abstract syntax tree, a data flow graph, or any other technically feasible form of graph that represents data dependency and computation within the input code. As shown, the graph representation comprises a data flow graph. In certain embodiments, step 110 includes multiple compiler phases that may generate two or more different intermediate graph representations. In such embodiments, the initial graph representation comprises one of the two or more different intermediate graph representations. The initial graph representation may be implemented as a data structure using any technically feasible data structure configured to represent a graph comprising two or more nodes associated through one or more edges.

In step 112, the compiler annotates the initial graph representation with initial attributes for known or predefined edges to generate a partially annotated graph representation. The attributes may include, without limitation, dynamic range, sign, and numeric resolution requirements for output data types, input data types, or any combination thereof. For example, if an output product of the program code comprises unsigned twelve-bit integer values, then a corresponding output edge would be annotated to indicate a predefined attribute of a positive value having a narrow dynamic range, and twelve bits of numeric resolution.

In step 114, the compiler applies one or more propagation rules to the partially annotated graph representation to generate a fully annotated graph representation. A given propagation rule may propagate a dynamic range, sign, or numeric resolution requirement from an operation output to associated inputs for the operation. A given propagation rule may instead propagate dynamic range or numeric resolution attributes from an operation input to an associated output. In one embodiment, the compiler visits each node within the partially annotated graph representation once in a given propagation pass to generate a first intermediate fully annotated graph representation. If a propagation rule applies to a node, then the compiler updates edge attributes associated with the node, based on the propagation rule. The compiler performs sequential propagation passes over a sequence of intermediate fully annotated graph representations to generate subsequent intermediate fully annotated graph representation, and so forth, until no propagation rule matches any node within a given intermediate fully annotated graph representation during the propagation pass. When no propagation rule matches are found in a given propagation pass, the intermediate fully annotated graph representation is designated the fully annotated graph representation. In one embodiment, step 114 is implemented by a method 102, described below in FIG. 1B.

In step 116, the compiler selects appropriate numeric types for each edge within the fully annotated graph representation to generate a transformed graph representation. For example, if a particular edge attribute specifies a positive, narrow dynamic range number requiring twenty-four bits of numeric resolution, then an unsigned twenty-four bit integer type may be selected for the edge.

In step 118, the compiler generates code based on the transformed graph representation. Each node within the transformed graph representation includes a specification for an arithmetic operation, and each edge includes attributes specifying dynamic range and numeric resolution. The generated code may comprise machine instructions, intermediate representation instructions, executable instruction or any other technically feasible set of instructions. The compiler may implement any technically feasible technique to generate code from the transformed graph representation.

The generated code may comprise one or more instructions. A given instruction may perform a specified arithmetic operation, a specified casting operation, or a combination of a specified arithmetic operation and at least one specified casting operation. Casting operations may be performed on an output of an arithmetic operation, on one or more inputs to the arithmetic operation, or a combination thereof. Each casting operation casts data from a source type to a target type. In one embodiment, a casting operation may cast a floating-point source type to a fixed-point target type. The fixed-point target type may provide similar or different numeric resolution compared to the floating-point source type. In another embodiment, a casting operation may cast a floating-point source type to a floating-point source type with a different precision. In yet another embodiment, a casting operation may cast a fixed-point source type to a fixed-point source type with a different precision. A single instruction that performs both an arithmetic operation and a casting operation is referred to herein as a casting-arithmetic instruction. A given casting-arithmetic instruction may operate on scalar data or vector data. For example, a casting-arithmetic scalar addition instruction may be configured to add two scalar floating-point inputs to generate a scalar twelve-bit integer output, while a casting-arithmetic vector instruction may operate on a vector of floating-point elements ("vec2, vec3," and so forth) to generate a corresponding vector of twelve-bit fixed-point integers as an output.

A set of arithmetic instructions, casting instructions, casting-arithmetic instructions, or any combination thereof may be implemented within a processing unit configured to serve as a target for the compiler. For example, streaming multiprocessors (SMs) 250 of FIG. 2 may be configured to implement an appropriate collection of arithmetic instructions, casting instructions, and casting-arithmetic instructions. The compiler is configured to generate targeted code for the SMs 250, whereby the targeted code may include instructions from the appropriate collection. The targeted code may be transmitted to the target processing unit for immediate execution, or stored for later execution. In one embodiment, the generated code is cached within a target processor, such as PPU 200, for execution on demand.

Figure 1B:
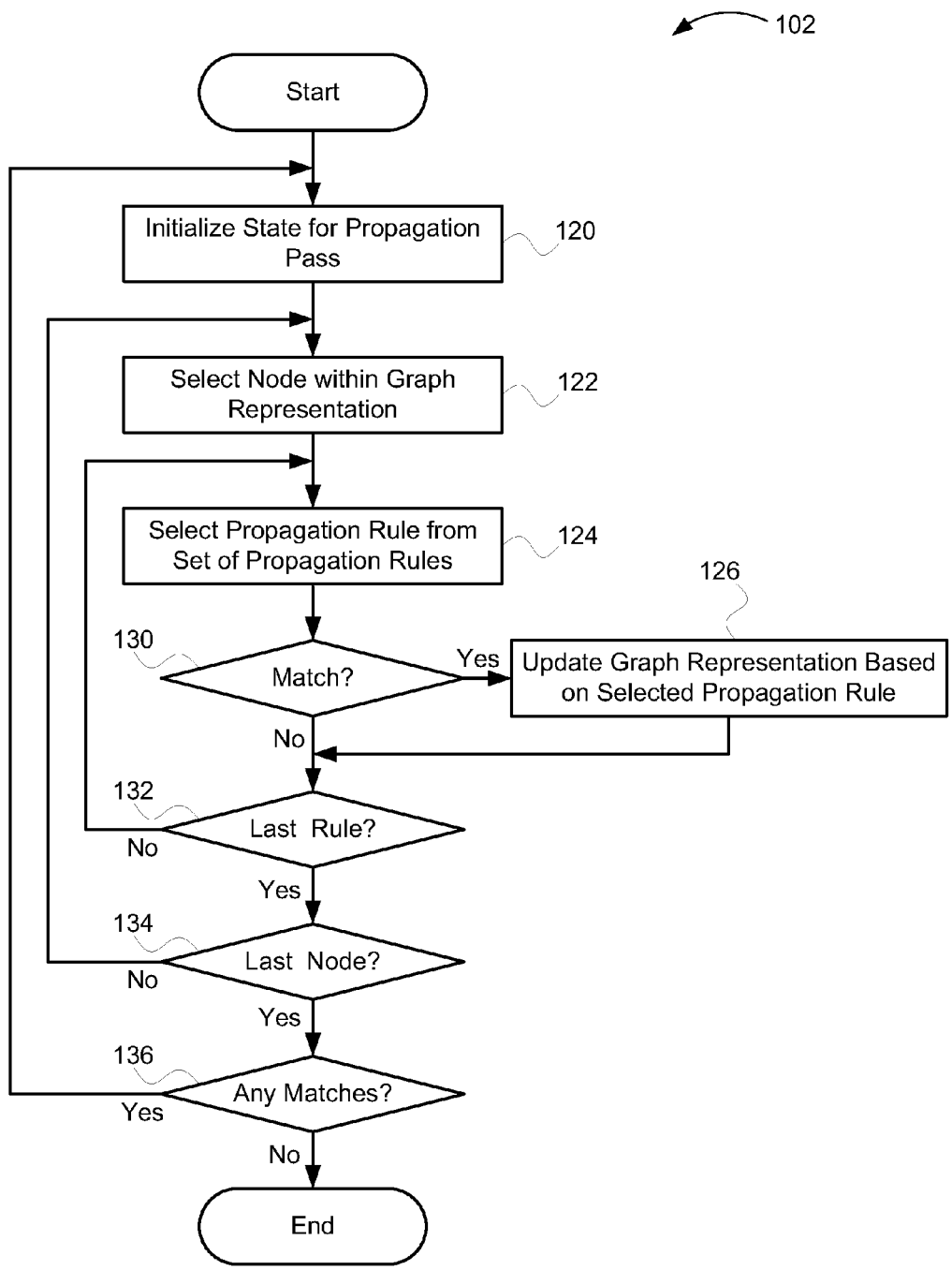
FIG. 1B illustrates a flow chart of a method for applying propagation rules to a graph representation, in accordance with one embodiment.

FIG. 1B illustrates a flow chart of a method 102 for applying propagation rules to a graph representation, in accordance with one embodiment. Although method 102 is described in conjunction with the systems of FIGS. 2-5A and 7, persons of ordinary skill in the art will understand that any system that performs method 102 is within the scope and spirit of embodiments of the present invention. Method 102 may be implemented in conjunction with a compiler front-end, compiler subsystem, optimizer, or code generator in a software tool chain configured to generate code that targets a GPU, a CPU, a digital signal processor (DSP), or any other type of processing unit configured to execute floating-point instructions and integer instructions. In one embodiment, method 102 implements step 114 of method 100, shown in FIG. 1A. Method 102 may be implemented within the compiler.

Method 102 begins in step 120, where the compiler initializes state information for a propagation pass. In one embodiment, the state information includes a match flag, configured to indicate whether a propagation rule was matched, and therefore applied, during the current propagation pass. Initializing the state information should include resetting the match flag to indicate no propagation rule was matched during the current propagation pass. While method 102 is described with respect to a match flag, any technically feasible indicator may be implemented to indicate whether a propagation rule was matched, indicating a change to the graph representation. Each propagation pass should visit every node within the graph representation. Any technically feasible graph traversal algorithm may be performed to visit each node within the graph, and initializing the state information may comprise selecting a designated initial node to begin each propagation pass.

In step 122, the compiler selects a node within the graph representation. The selected node may comprise an input node or an output node during an initial iteration and one node in a sequence of nodes comprising the graph representation thereafter. In one embodiment, a node adjacent to a recently modified node is preferentially selected by the algorithm. Any technically feasible technique may be implemented to select a node in the sequence of nodes. In one embodiment, an output node for the graph representation comprises the first selected node.

In step 124, the compiler selects a propagation rule from a set of propagation rules to test against the selected node. A propagation rule defines criteria for matching a node within the graph representation, and specifies attribute modifications for the graph representation should a match occur. The criteria may include different attributes for anode and edges associated with the node, such as a type of arithmetic operation specified by the node, a sign attribute for inputs to the node, dynamic range requirements for an output of the node, numeric resolution requirements for the output of the node, and the like. If, in step 130, the selected propagation rule is a match for the selected node, then the method proceeds to step 126, where the compiler updates the graph representation based on the selected propagation rule. Updating the graph representation may include, without limitation, attribute modifications to edges associated with the node. Additionally, the match flag should be set to a true state. If, however, the selected propagation rule is not a match for the selected node, then the method proceeds to step 132.

If, in step 132, the selected rule is the last rule, then the method proceeds to step 134, otherwise the method proceeds back to step 124. If, in step 134, the selected node is the last node to be visited in the graph representation, then the method proceeds to step 136, otherwise the method proceeds back to step 122. If, in step 136, any propagation rule matches occurred during a current propagation pass, such as indicated by the match flag, then the method proceeds back to step 120. Otherwise, the method terminates.

FIG. 1C is a table of propagation rules for transforming nodes within a data flow graph, in accordance with one embodiment. Eight rules are shown, with each rule numbered under the "No," column. A corresponding arithmetic operation is indicated under the "Op," column. The table shown in FIG. 1C only includes rules applicable to arithmetic addition (ADD) and multiplication (MUL). However, rules for other arithmetic operations, e.g., division, subtraction, reciprocal, square root, power, etc. . . . , may also be implemented without departing the scope of the present invention. Certain arithmetic functions may preclude propagation. Such arithmetic functions need not have an explicit propagation rule inhibiting propagation, as propagation of an attribute is only an outcome of matching an explicit rule.

The first rule propagates dynamic range (exponent range, indicated as an "E") from an output to inputs through an addition operation. If both inputs to the addition operation are of the same sign ("+"), then both can be limited to the output range of the operation. The input with the larger exponent will determine the exponent of the output, and the LSBs of the other input can be dropped to bring the other input up to the same exponent. Note that this rule does not apply if the inputs have different signs. Two numbers with large exponents could be subtracted resulting in a difference with a small (or negative) exponent. Propagation is indicated here with respect to only dynamic range (E), with precision unchanged (*) and each term known to be positive (+).

The second rule propagates numeric resolution, also referred to as precision (indicated by a "P"), leaving dynamic range unchanged (*). For example, if the result of an addition operation needs only twelve bits of output precision and if both inputs are the same sign, then neither input needs to be more than twelve bits or precision.

The third and fourth rules propagate dynamic range and precision from the input of an addition operation to the output of the addition operation. More specifically, the third rule propagates the larger dynamic range of the two inputs (E1, E2) to define the dynamic range of the output (MAX (E1, E2)). This is accomplished by propagating the larger of two exponent ranges ("E1" and "E2") as the output exponent range. For example, if E1 corresponds to the number of exponent bits in a floating-point representation and E2 represents zero exponent bits associated with a fixed-point representation, then the output dynamic range is propagated to be that of E1. The fourth rule propagates precision along with dynamic range.

Propagation rules for certain multiplication scenarios are shown in the fifth rule through the eighth rule. The fifth rule propagates precision. More specifically, in the fifth rule, an output precision for a multiplication operation (**P) defines input precision for the multiplication operation. Any additional input precision beyond that of the output precision is superfluous. In the sixth rule, an input precision representing the least available input precision defines output precision. In multiplication, the output exponent is the sum of the input exponents, therefore if any two of three exponents comprising two input exponents and an output exponent are known, then the third of three exponent may be inferred. The seventh rule infers dynamic range for the second input based on the dynamic range of the output and the dynamic range of a first input. The eighth rule infers an output dynamic range (Eo) based on dynamic range of the first input and second input.

In one embodiment, if any of the above rules are in conflict, then one rule may be selected that yields the lowest precision and most restricted range of exponents. For example, if a multiply operation has inputs with 24-bit precision and an output with 12-bit precision, then rule 5 will be applied in preference to rule 6 to reduce the input precision. In one embodiment, a rule will not be applied if its application increases precision or dynamic range. Rules are only applied when they reduce precision and/or restrict dynamic range.

A Parallel Processing Unit

Figure 2:
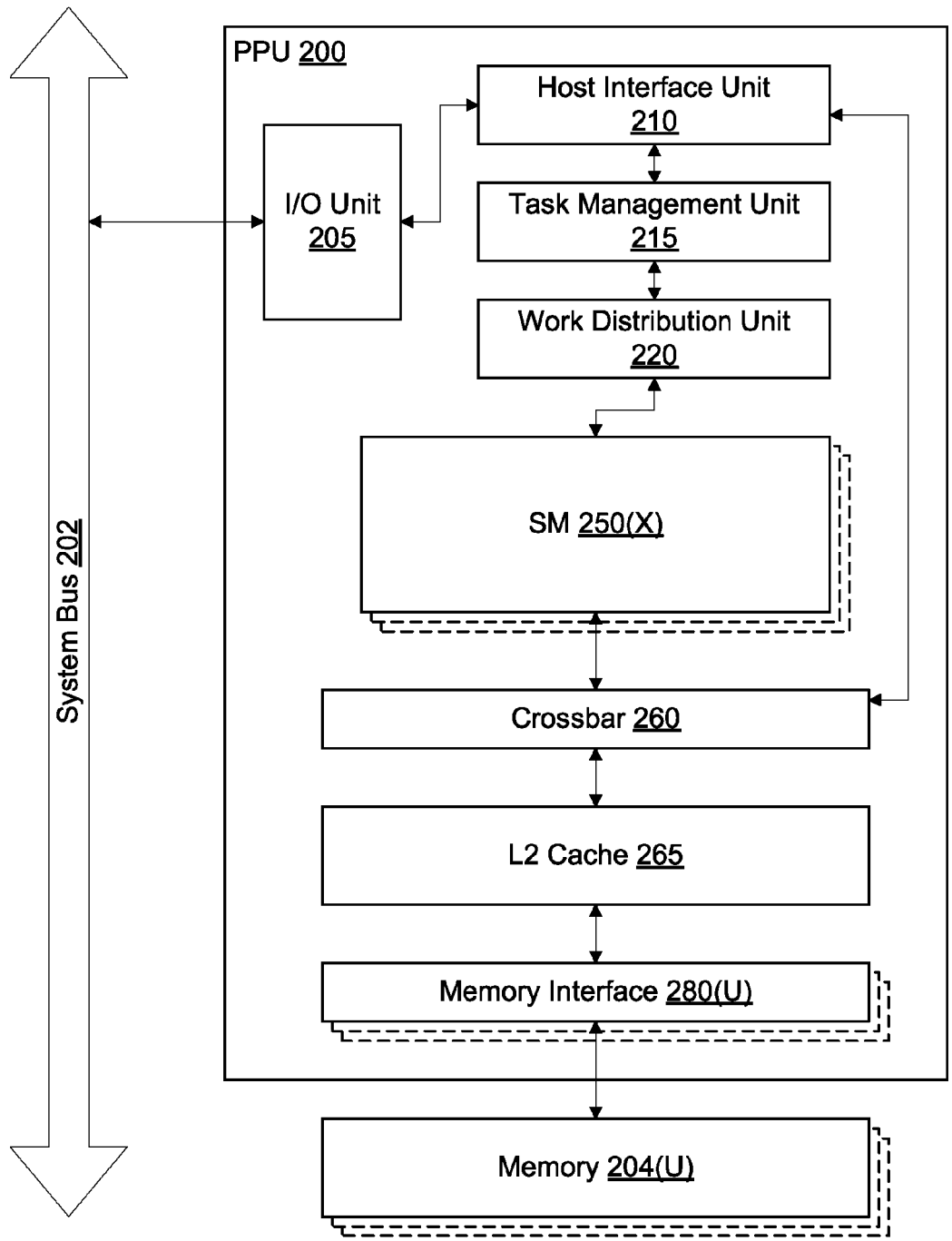
FIG. 2 illustrates a parallel processing unit (MI), according to one embodiment.

FIG. 2 illustrates a parallel processing unit (PPL) 200, according to one embodiment. While a parallel processor is provided herein as an example of the PPD 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to a task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or, the like, for high-speed data transfer. In one embodiment, the PPU 200 comprises U memory interfaces 280(U), where each memory interface 280(U) is connected to a corresponding memory device 204(U). For example, PPU 200 may be connected to up to six memory devices 204, such as graphics double-data-rate, version 5, synchronous dynamic random access memory (GDDR5 SDRAM).

In one embodiment, the PPU 200 implements a multi-level memory hierarchy. The memory devices 204 may be located off-chip in SDRAM coupled to the PPU 200. Data from the memory devices 204 may be fetched and stored in the L2 cache 265, which is located on-chip and is shared between the various SMs 250. In one embodiment, each of the SMs 250 also implements an L1 cache. The L1 cache may be implemented as private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PHI 200 is configured to receive commands that specify shader programs for processing graphics data. Graphics data may be defined as a set of primitives such as points, lines, triangles, quads (rectangles), triangle strips, and the like. Typically, a primitive includes data that specifies a number of vertices for the primitive (e.g., in a model-space coordinate system) as well as attributes or rendering parameters associated with each vertex of the primitive. Rendering parameters may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and rendering parameters) to memory, such as system memory associated with the CPU or memory devices 204. The model data defines each of the objects that may be visible on a display. The application then makes an API call to the driver kernel that requests the model data to be rendered and displayed. The driver kernel reads the model data and writes commands to a buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen-space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (IGPU) included in the chipset (i.e., Northbridge) of the motherboard.

Figure 3:
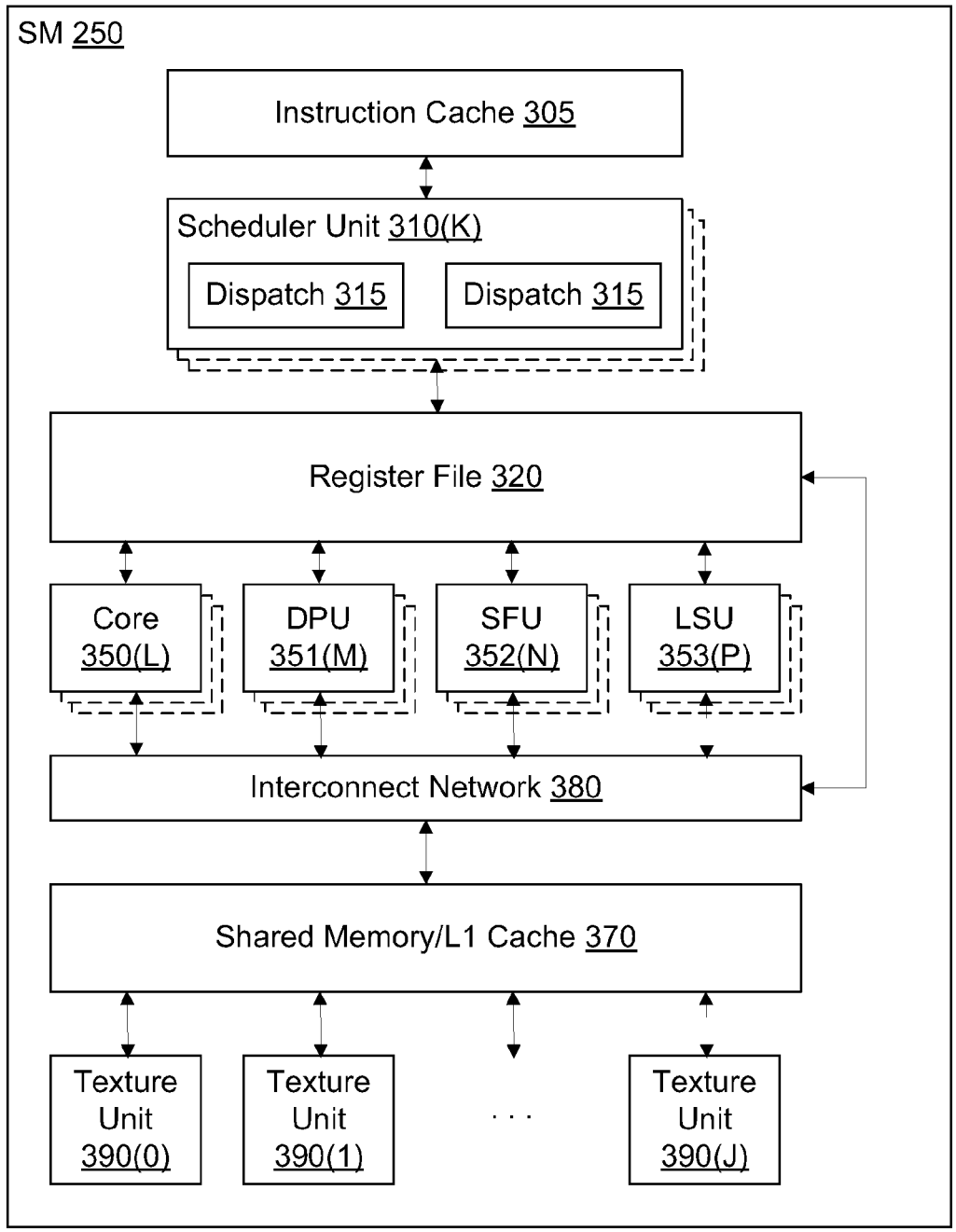
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 implements a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes interconnect network 380, configured to connect each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4:
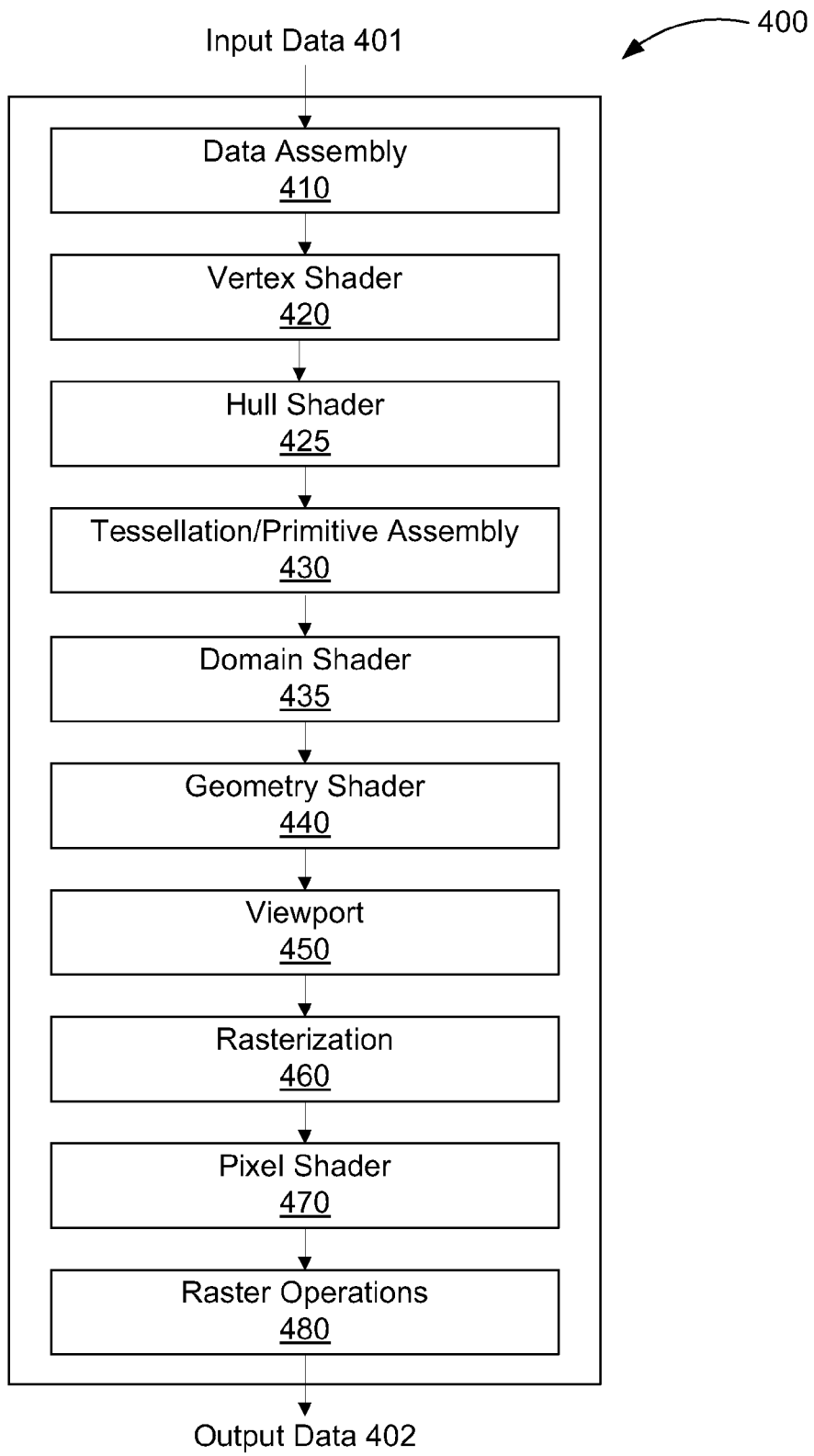
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shader stage 420, a hull shader stage 42, a tessellation/primitive assembly stage 430, a domain shader stage 435, a geometry shader stage 440, a viewport transform stage 450, a rasterization stage 460, a pixel shader stage 470, and a raster operations stage 480. In one embodiment, the input data 401 comprises commands that configure the processing units to implement the stages of the graphics processing pipeline 400 and high-order geometric primitives to be processed by the stages. The output data 402 may comprise pixel data (i.e., color data) that is copied into a frame buffer or other type of surface data structure in a memory (e.g., memory 204). The SMs 250 may be configured by shade: program instructions to function as one or more of the shader stages (e.g., vertex, hull, domain, geometry, and pixel shaders).

The data assembly stage 410 receives the input data 401 that specifies vertex data for high-order graphics geometry. The data assembly stage 410 collects the vertex data defining the high-order graphics geometry in a temporary storage or queue, such as by receiving a command from the host processor that includes a pointer to a buffer in a memory system 405 and reading the vertex data from the buffer. In one embodiment, the memory system 405 may include one or more of the memory 204, the L2 cache 265, and the shared memory/L1 cache 370. The vertex data is then transmitted to the vertex shader stage 420 for processing.

The vertex shader stage 420 processes vertex data by performing a set of operations (i.e., a vertex shader or a program) once for each of the vertices. Vertices may be, e.g., specified as a 4-coordinate vector associated with one or more vertex attributes. The vertex shader stage 420 may manipulate properties such as position, color, texture coordinates, and the like. In other words, the vertex shader stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shader stage 420 generates transformed vertex data that is transmitted to the hull shader stage 425.

Conventional graphics processing pipelines transmit the transformed vertex data between different stages through a set of pipeline registers or a dedicated FIFO buffer. As shown in FIG. 4, the vertex shader stage 420 may pass the vertex data directly to the hull shader stage 425.

The tessellation/primitive assembly stage 430 receives the control points passed from the hull shader stage 425 and tessellates the patches into geometric primitives for processing by the domain shader stage 435. For example, the tessellation/primitive assembly stage 430 may be configured to group every three consecutive vertices as a geometric primitive (i.e., a triangle) for transmission to the domain shader stage 435. In some embodiments, specific vertices may be reused for consecutive geometric primitives (e.g., two consecutive triangles in a triangle strip may share two vertices). After tessellation, the amount of data representing graphics geometry received as input data 401 may be significantly larger because the granularity of the geometry typically becomes finer, requiring more data, as the geometry is processed by the different stages of the graphics processing pipeline.

The domain shader stage 435 computes vertex position attributes for each tessellated vertex. The vertex position attributes generated by the domain shader stage 435 may be passed directly to the geometry shader stage 440 or may be passed to the geometry shader stage 440. The geometry shader stage 440 processes geometric primitives by performing a set of operations (i.e., a geometry shader program) on the geometric primitives. Geometry shading operations may generate one or more geometric primitives from each geometric primitive. In other words, the geometry shader stage 440 may subdivide each geometric primitive into a finer mesh of two or more geometric primitives for processing by the rest of the graphics processing pipeline 400. The geometry shader stage 440 transmits resulting geometric primitives (e.g., points, lines triangles, and the like) to the viewport stage 450.

The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives my each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of plane equations from which various attributes can be interpolated. The rasterization stage 460 may also compute a coverage mask for a plurality of pixels that indicates whether one or more sample locations for a pixel intercept the geometric primitive. In one embodiment, z-testing may also be performed to determine if the geometric primitive is occluded by other geometric primitives that have already been rasterized. The rasterization stage 460 generates fragment data (i.e., coverage masks for each covered geometric primitive) that are transmitted to the pixel shader stage 470.

The pixel shader stage 470 processes fragment data by performing a set of operations (i.e., a fragment shader or a program) on each of the fragments. The pixel shader stage 470 may generate pixel data (i.e., color values) for the fragment such as by performing lighting operations or sampling texture maps using interpolated texture coordinates for the fragment. The pixel shader stage 470 generates pixel data that is transmitted to the raster operations stage 480. In one embodiment, the pixel shader stage 470 may access data generated by an upstream processing unit. For example, the pixel shader stage 470 may read per-patch attributes that were generated by the hull shader stage 425 and/or per-primitive attributes that were generated by the geometry shader stage 440. In one embodiment, the viewport stage 450 may be configured to compute additional attributes for clipped perspective corrected barycentric coordinates that are used by the pixel shader stage 470 to perform barycentric interpolation to compute per-sample or per-pixel attributes. In another embodiment, the pixel shader stage 470 may read per-patch control point attributes and compute the per-sample or per-pixel attributes.

The raster operations stage 480 may perform various operations on the pixel data such as performing alpha tests, stencil tests, and blending the pixel data with other pixel data corresponding to other fragments associated with the pixel. When the raster operations stage 480 has finished processing the pixel data (i.e., the output data 402), the pixel data may be written to a render target such as a frame buffer, a color buffer, or the like. The raster operations stage 480 may be configured to perform gamma adjustment operations to decode and/or encode one or more sets of digital video data.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments. Other types of graphics processing pipelines are contemplated as being within the scope of the present disclosure. Furthermore, any of the stages of the graphics processing pipeline 400 may be implemented by one or more dedicated hardware units within a graphics processor such as PTV 200. Other stages of the graphics processing pipeline 400 may be implemented by programmable hardware units such as the SM 250 of the PPU 200.

Figure 5A:
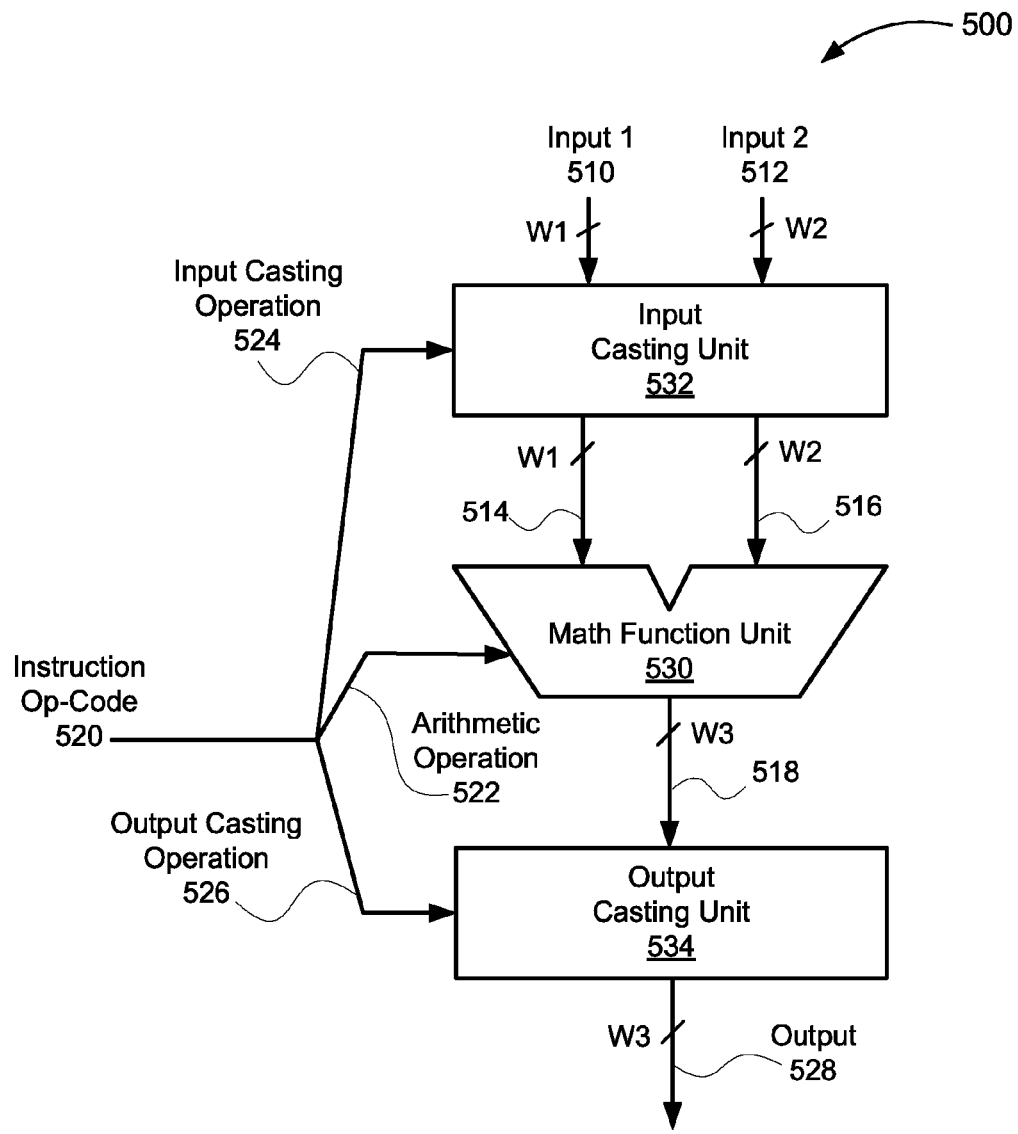
FIG. 5A illustrates an arithmetic unit configured to execute casting instructions, according to one embodiment.

FIG. 5A illustrates an arithmetic unit 500 configured to execute casting-arithmetic instructions, according to one embodiment. The arithmetic unit. 500 may be included within one or more of the core 350, DPU 351, SFU 352, and texture units 390 shown in FIG. 3. As discussed previously, a casting-arithmetic instruction is a single instruction that is configured to perform at least one casting operation in addition to a specified arithmetic operation. Different casting operations may be performed separately on each input as well as on the output.

As shown, the arithmetic unit 500 comprises an input casting unit 532, a math function unit 530, and an output casting unit 534. An instruction op-code 520 is configured to include an arithmetic operation 522 and at least an output casting operation 526, an input casting operation 524, or a combination of both casting operations 526 and 524. The arithmetic operation 522, the output casting operation 526, and the input casting operation 524 may be encoded together or as independent fields comprising the instruction op-code 520. The input casting operation 524 configures the input casting unit 532 to perform a specified casting operation on an input1 510, an input2 512, or both input1 510 and input2 512. In one embodiment, input1 510 and input2 512 may have different, independent casting operations applied. Input1 510 may comprise a scalar value or a vector comprising W1 numeric elements. Similarly, input2 512 may comprise a scalar value or a vector comprising W2 numeric elements. Input1 510 and input2 512 may each be cast to a required type to generate input 514 and input 516, respectively. Math function unit 530 is configured to perform the arithmetic operation 522 on input 514 and input 516 to generate output 518, which may include a scalar value or a vector comprising W3 numeric elements.

In one embodiment, math function unit 530 comprises a plurality of independent math function units, each configured to perform arithmetic operation 522 according to a specific numeric type. For example, math function unit 530 may include independent math function units, whereby a first math function unit is configured to operate on twelve-bit integers, a second math function unit configured to operate on twenty-four bit integers, and a third math function unit configured to operate on floating-point values. When a twelve-bit arithmetic operation is required, the twelve-bit math function unit performs the arithmetic operation, requiring less power than either of the other two math function units. A given math function unit may be selected based on dynamic range and numeric resolution requirements associated with input1 510, input2 512, and output 528. Alternatively, math function unit 530 may comprise a single math function unit configured to perform arithmetic operations 522 at different numeric resolutions, in either a floating-point or fixed-point mode. To reduce power consumption, the math function unit may include certain circuit features configured to disable superfluous circuitry. For example, circuitry associated with calculating an output exponent may be disabled when the math function unit is computing a fixed-point output 518. In such an embodiment, the math function unit 530 may be configured to compute output 518 according to a minimum numeric resolution and a minimum dynamic range, dictated by requirements of input1 510 input2 512, and output 528.

Figure 5B:
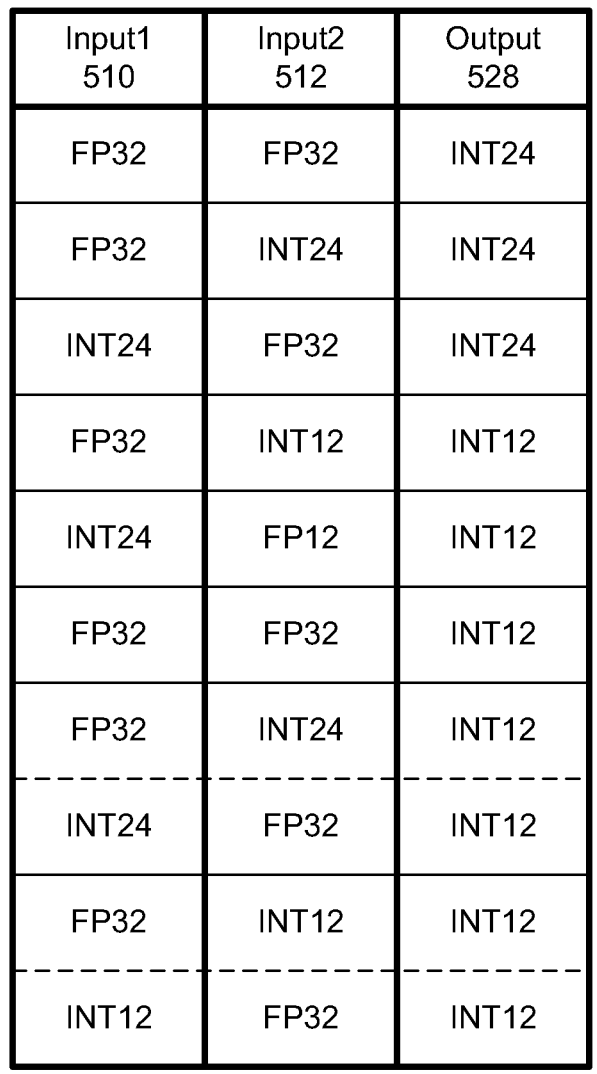
FIG. 5B is a table of exemplary casting operation combinations for execution in conjunction with a casting-arithmetic instruction, according to one embodiment.

FIG. 5B is a table 502 of exemplary casting operation combinations for execution in conjunction with a casting-arithmetic instruction, according to one embodiment. As shown, input1 510, input2 512, and output 528 may each independently specify a different numeric type. For example, each may specify a thirty-two bit floating-point numeric type (FP32), a signed twenty-four bit fixed-point or integer numeric type (INT24), or a signed twelve-bit fixed-point or integer numeric type (INT1.2). For clarity, only certain exemplary numeric types and exemplary combinations of the numeric types are shown, however these and any other technically feasible casting operation combinations of arbitrary numeric types may be implemented without departing the scope and spirit of the present invention. Additional numeric types may include, without limitation, unsigned twelve and twenty-four bit integers, signed and unsigned eight-bit integers, sixteen-bit floating-point types, and the like. Input1 510, input2 512, and output 528 may each comprise scalar or vector numeric data.

Figure 5C:
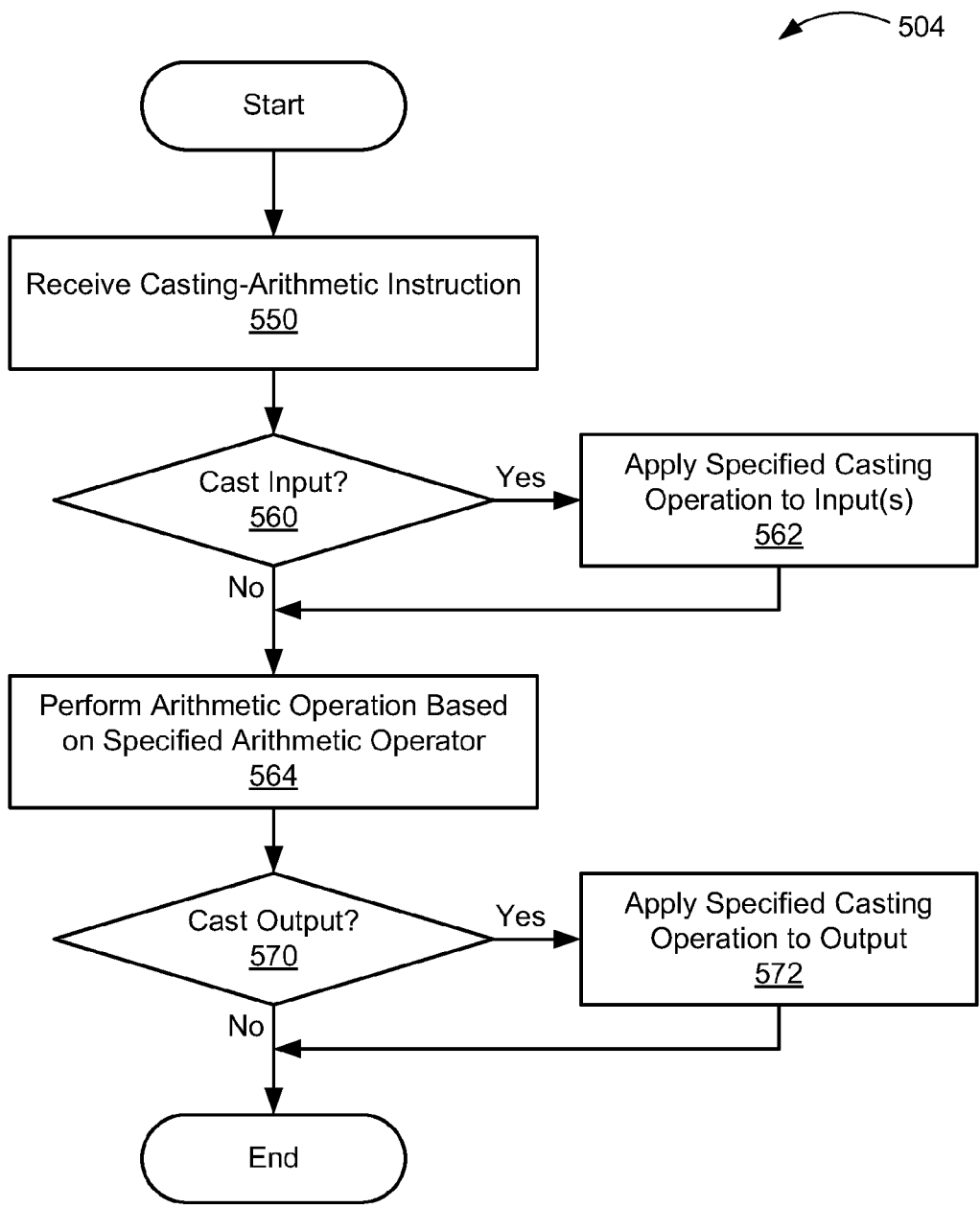
FIG. 5C illustrates a flow chart of a method for executing a casting-arithmetic instruction comprising a casting operation and an arithmetic operation, according to one embodiment.

FIG. 5C illustrates a flow chart of a method 504 for executing a casting-arithmetic instruction comprising a casting operation and an arithmetic operation, according to one embodiment. Although method 504 is described in conjunction with the systems of FIGS. 2-5A and 7, persons of ordinary skill in the art will understand that any system that performs method 504 is within the scope and spirit of embodiments of the present invention. Method 504 may be implemented by a GPU, a CPU, a digital signal processor (DSP), or any other type of processing unit configured to execute arithmetic instructions having different dynamic range, different numeric resolution, or a combination thereof. In one embodiment, a processing unit such as SM 250 of FIG. 2 is configured to perform method 504, and a shader program configured to execute on SM 250 comprises at least one casting-arithmetic instruction that specifies an arithmetic operation and a casting operation.

Method 504 begins in step 550, where a processing unit receives a casting-arithmetic instruction. The casting-arithmetic instruction specifies an arithmetic operation and one or more casting operation. A given casting operation may be specified to apply to an input of the arithmetic operation or the output of the arithmetic operation. If, in step 560, the casting-arithmetic instruction specifies a casting operation for at least one input, then the method proceeds to step 562. In step 562, the processing unit applies the casting operation to a specified first input. In certain embodiments, the casting operation, a different casting operation or no casting operation is applied to a second input.

Returning to step 560, if the casting-arithmetic instruction specifies no casting operation for an input, then the method proceeds to step 564. In step 564, the processing unit performs the specified arithmetic operation associated with the casting-arithmetic instruction. The specified arithmetic operation generates an intermediate output value. The specified arithmetic operation may comprise, without limitation, addition, subtraction, multiplication, division, a square root, a power function, a reciprocal, or any other technically feasible arithmetic function. The arithmetic operation may be performed as a floating-point operation, a signed fixed-point operation, or an unsigned fixed-point operation. These arithmetic operations may be performed on one or more scalar inputs or one or more vector inputs. Each arithmetic operation may be performed over one or more pipeline stages. Each input value may be retrieved from a register that is local to the processing unit, a memory subsystem coupled to the processing unit, or any other technically feasible data storage circuit.

If, in step 570, the casting-arithmetic instruction specifies a casting operation for the output, then the method proceeds to step 572, where the processing unit applies an output casting operation to the intermediate output value to generate an output value. If the casting-arithmetic instruction does not specify a casting operation, then the output value is assigned to be the intermediate output value.

FIG. 6A illustrates an exemplary input code listing that specifies a fragment shader program, in accordance with one embodiment. As shown, the input code listing comprises nine statements. A first statement declares a varying vec3 floating-point input named "normal", the surface normal vector. A second statement declares a floating-point vec3 variable called "lightVec" that is assigned a value based on vec3 floating-point inputs "light.position" and "position". A third statement declares and assigns a vec3 floating-point variable "lightNorm" to a normalized vector of "lightVec", and so forth. A ninth statement declares and assigns a return value "gl_fragcolor" comprising a vec4 floating-point value.

Figure 6B:
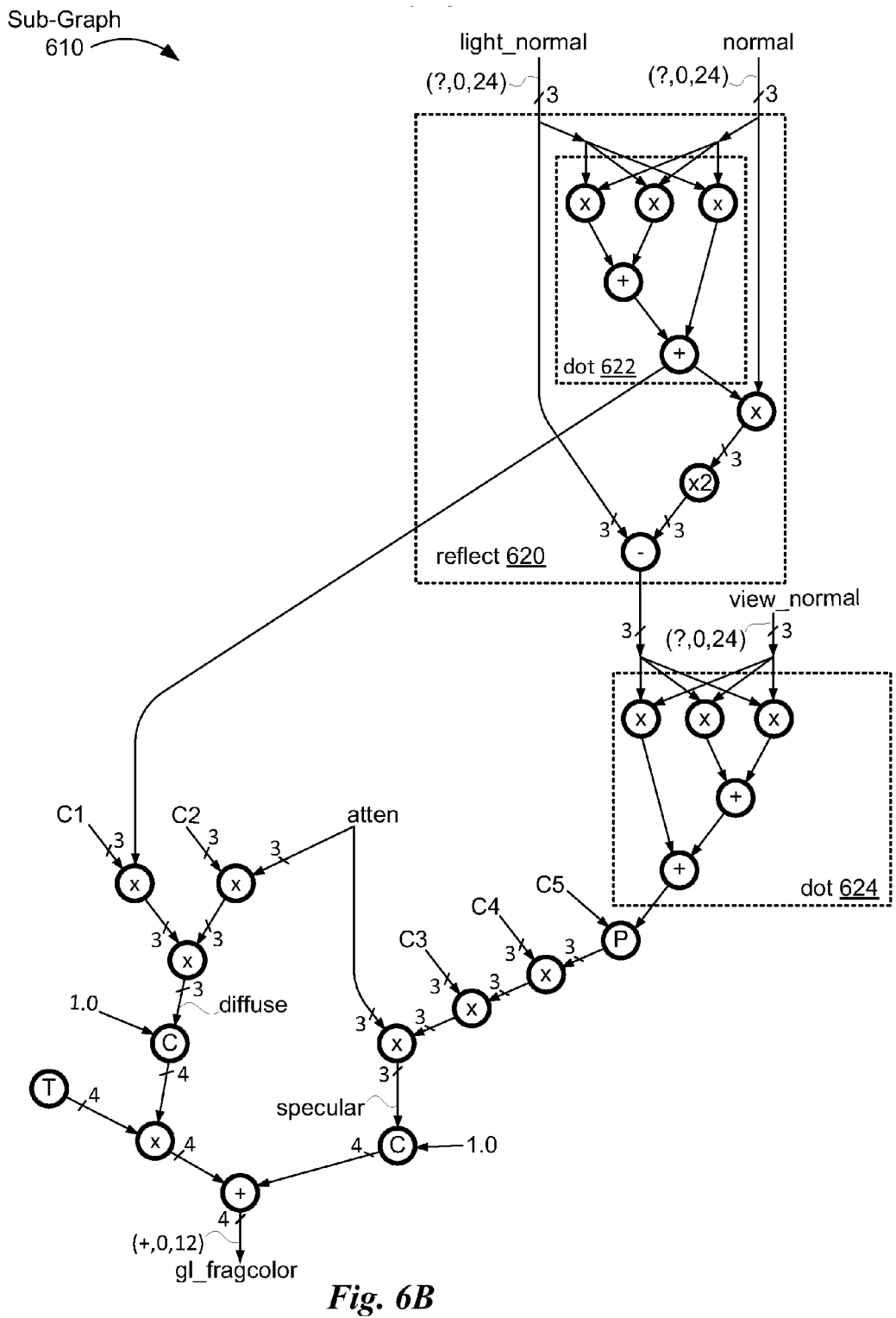
FIG. 6B illustrates a sub-graph corresponding to the fragment shader program of FIG. 6A, in accordance with one embodiment.
Figure 6C:
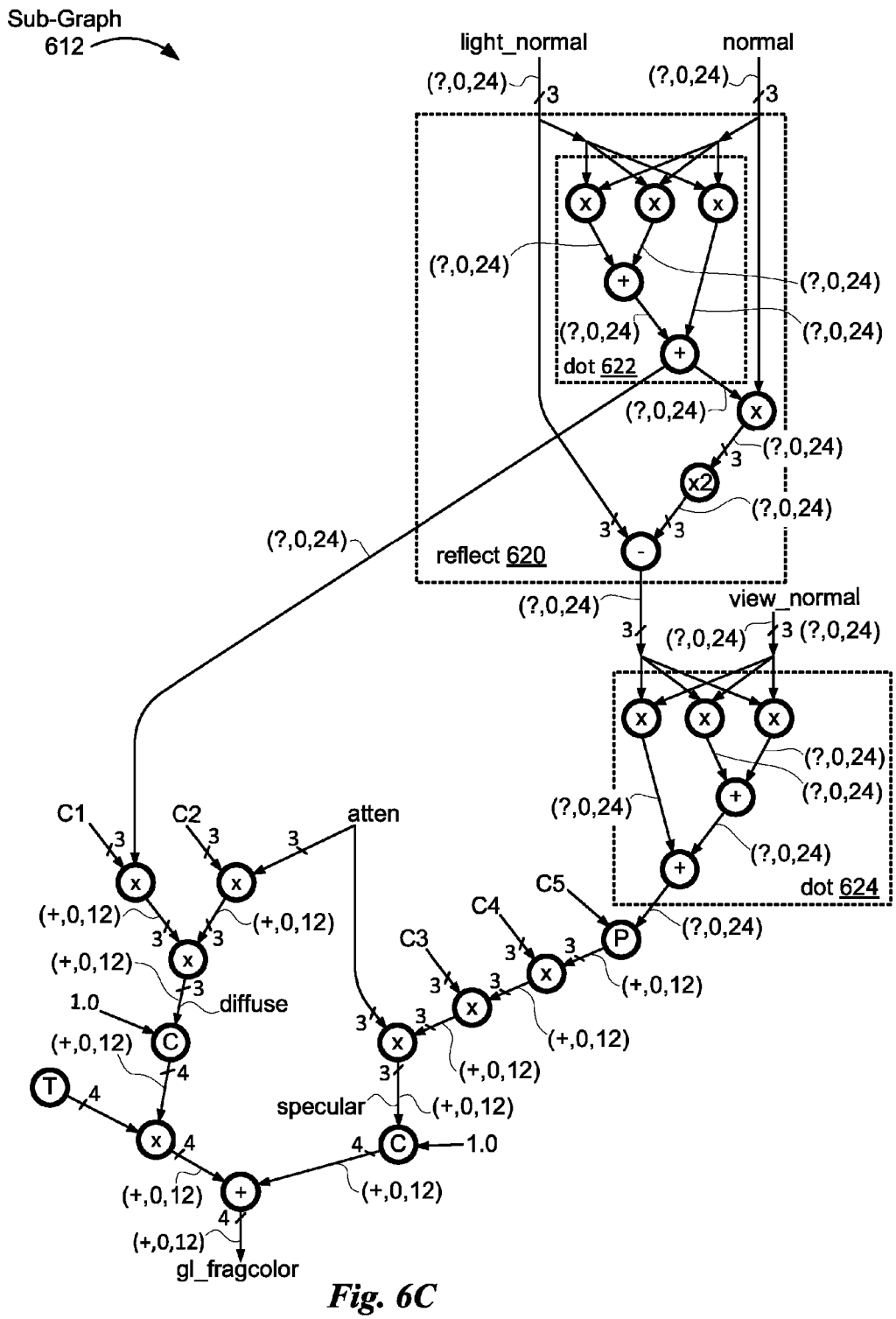
FIG. 6C illustrates a sub-graph, comprising the sub-graph of FIG. 6B annotated with inferred numeric resolution and dynamic range, in accordance with one embodiment.
Figure 6D:
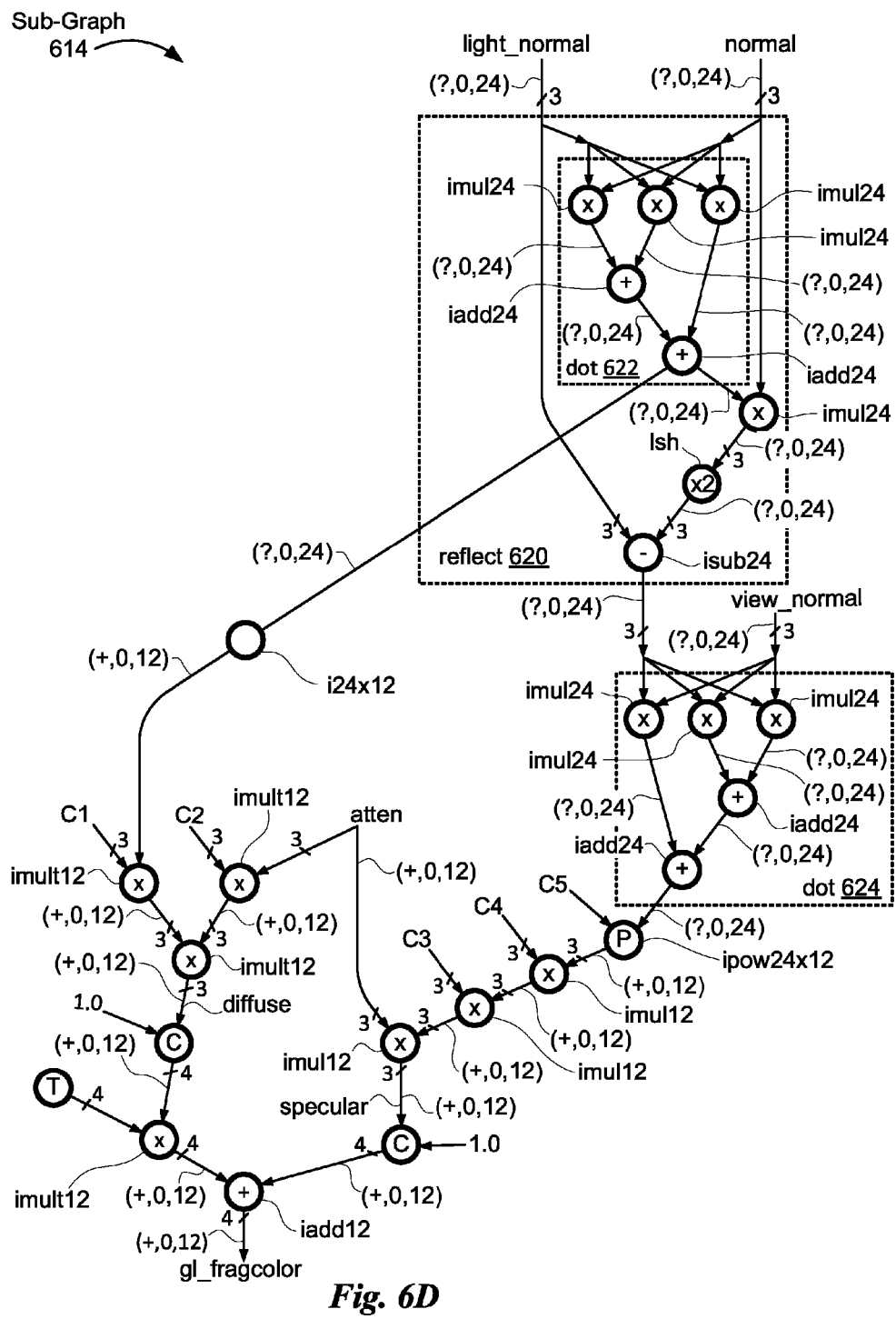
FIG. 6D illustrates a sub-graph, comprising the sub-graph of FIG. 6C with operations assigned for each node, in accordance with one embodiment.
Figure 6E:
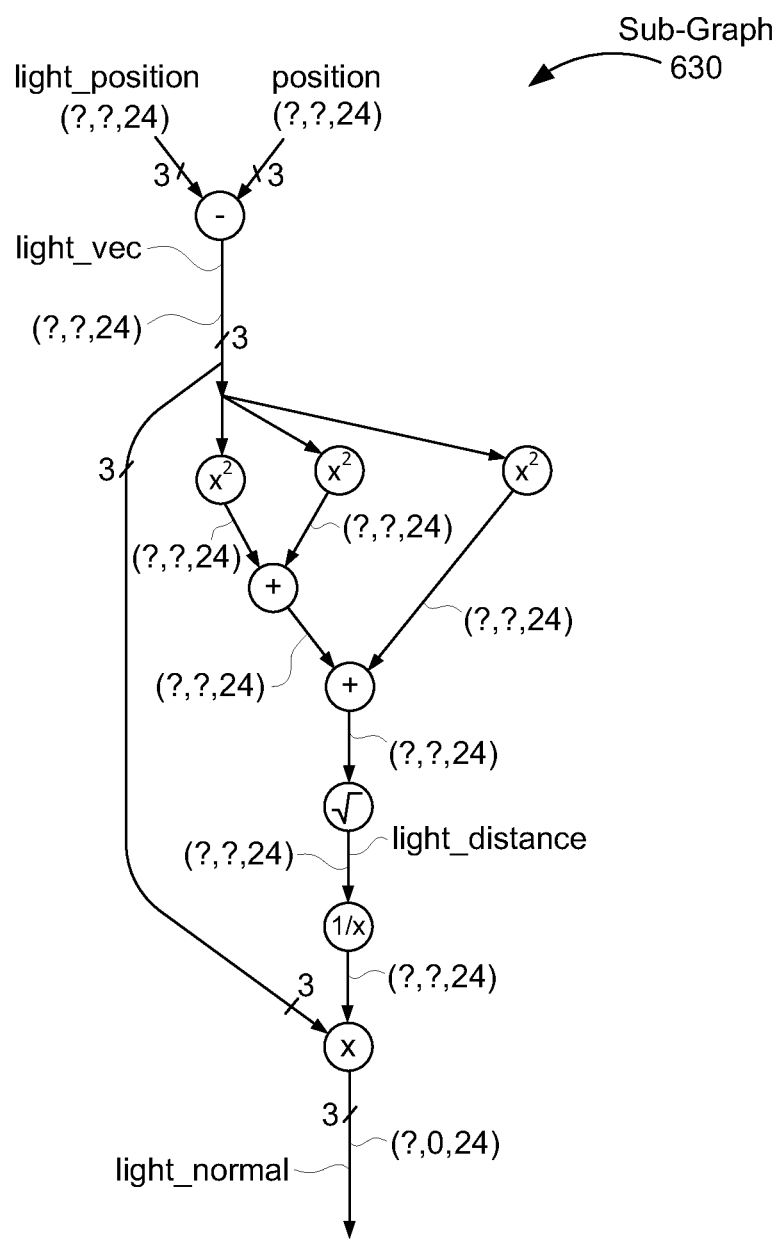
FIG. 6E illustrates a sub-graph for light distance computation and light normal computation associated with the fragment shader program of FIG. 6A after propagation rules are applied, in accordance with one embodiment.
Figure 6F:
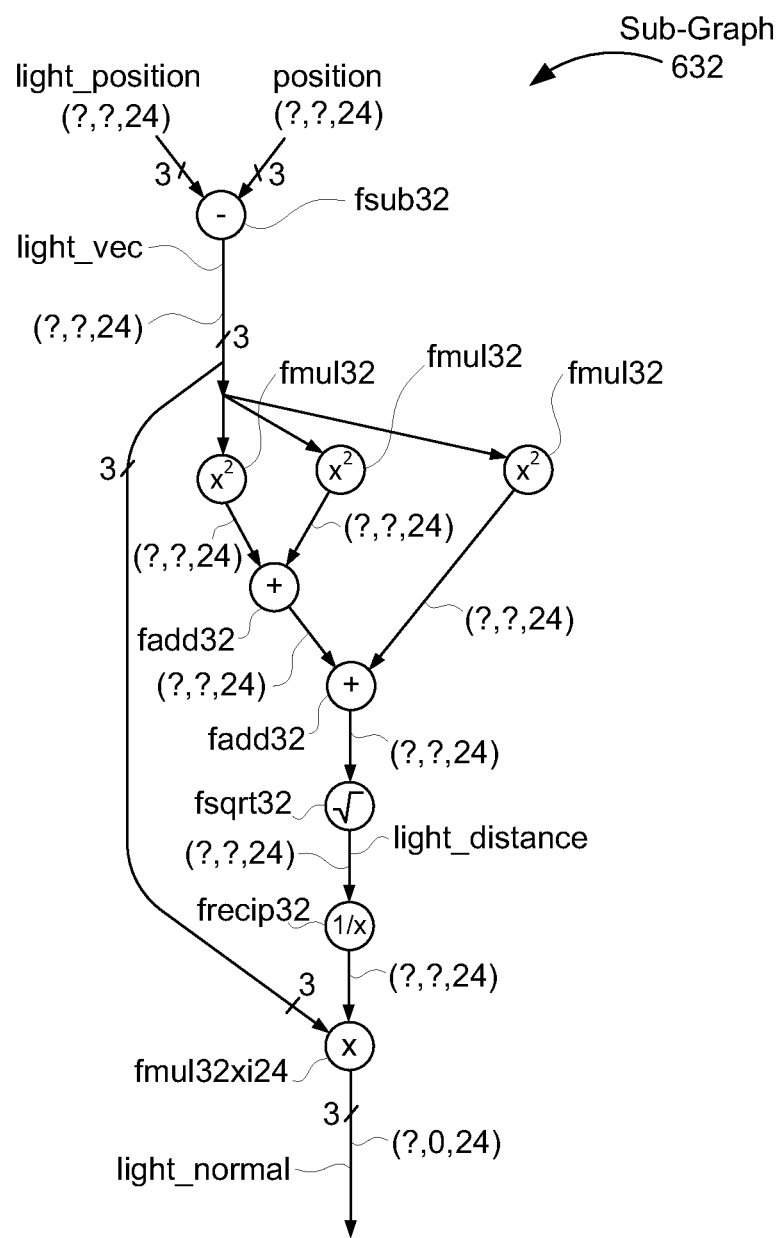
FIG. 6F illustrates a sub-graph comprising the sub-graph of FIG. 6E with operations assigned for each node, in accordance with one embodiment.

FIGS. 6B through 6D illustrate reducing numeric resolution requirements in portions of the fragment shader program, thereby enabling the use of instructions having lower numeric resolution. Instructions that implement relatively lower numeric resolution may require less execution power than corresponding instructions that implement a full available numeric resolution. FIGS. 6E and 6F illustrate reducing dynamic range requirements in portions of the fragment shader program, thereby enabling the use of an instruction having lower dynamic range, such as fixed-point instruction. Instructions, such as fixed-point instructions, that implement relatively lower dynamic range may require less execution power than corresponding instructions that implement a full available dynamic range, such as floating-point instructions.

FIG. 6B illustrates a sub-graph 610 corresponding to the fragment shader program of FIG. 6A, in accordance with one embodiment. As shown, the sub-graph 610 receives vec3 inputs "light_normal," "normal," "view_normal," representing corresponding terms in the fragment shader program. The term "atten" shown in sub-graph 610 represents the "atten" term computed in statement 5 of the fragment shader program. Constant C1 of sub-graph 610 corresponds to the "material.diffuse" term of the fragment shader program, and constant C2 corresponds to the "lightO.diffuse" term, constant C3 corresponds to "lightO.specular," constant C4 corresponds to "material.specular," and constant C5 corresponds to "material.pow." Each node is labeled with a generic operation performed by the node. For example, a node labeled with "+" represents an addition, a "−" represents a subtraction, a "*" represents a multiplication, a "P" represents a power function, a "C" represents a concatenation operation, and a "×2" represents a doubling function. Sub-graph 610 includes further sub-graphs, labeled reflect 620, dot 622, and dot 624, each configured to perform a respective operation associated with the fragment shader program. In one embodiment, sub-graph 610 comprises an example of the initial graph representation discussed in FIG. 1A.

An edge may be labeled with a specified numeric attribute in the form: (sign, dynamic range, numeric resolution in bits). A question mark (?) in the sign field indicates that an associated numeric value may be arbitrary. That is, the numeric value may be positive or negative. A "+" in the sign field indicates that the numeric value must be positive, while a "−"indicates that the numeric value must be negative. A question mark in the dynamic range field indicates that the dynamic range may be arbitrary with respect to available dynamic ranges. A floating-point representation accommodates an arbitrary dynamic range, limited only by the number of available exponent bits. A zero in the dynamic range field indicates the value has a narrow dynamic range—in the range [0 1], A number, such as "24" or "12" in the last position of an edge attribute indicates twenty-four bits or twelve bits of precision, respectively. As shown, light_normal is a vec3 type, and has attributes of "(?,0,24)," indicating that each element of the vec3 may have an arbitrary sign, each element is in the range [0 1], and that each element requires a numeric resolution of twenty-four bits. By contrast, gl_fragcolor is vec4 comprising four elements, with each of the four elements defined to be a positive value, in the range [0 1], and requiring twelve-bits of precision.

FIG. 6C illustrates a sub-graph 612, comprising the sub-graph 610 of FIG. 6B annotated with inferred numeric resolution and dynamic range, in accordance with one embodiment. As shown, each edge is annotated with a set of attributes that define numeric requirements for an associated intermediate value within the fragment shader program. In one embodiment, sub-graph 612 comprises an example of the fully annotated graph representation discussed in FIG. 1A. Edges having numeric requirements of lower dynamic range, lower numeric resolution, or fixed-signs present opportunities to select lower-power instructions to correspond to associated nodes. When numeric requirements may be relaxed on an output edge of a given node for subsequent processing, a casting-arithmetic instruction corresponding to the node may be selected to perform both the arithmetic operation indicated by the node, as well as a casting operation indicated by attributes of an edge associated with the node output. The output gl_fragcolor is generated by an addition node. As shown previously in FIG. 6B, the gl_fragcolor output is annotated to be a positive, low dynamic range number with twelve-bit numeric resolution (+,0,12). This attribute (+,0,12) is propagated through the addition node using the first propagation rule and the second propagation rule of FIG. 1C to annotate each input edge of the addition node to have the same respective attribute as the addition node output edge (+,0,12). The first propagation rule propagates the low dynamic range attribute (*,0,*), while the second propagation rule propagates the twelve-bit numeric resolution attribute (*,*,12).

FIG. 6D illustrates a sub-graph 614, comprising the sub-graph 612 of FIG. 6C with operations assigned for each node, in accordance with one embodiment. As shown, each node includes an instruction attribute, indicating a specific instruction for the node. For example, an output node configured to perform an addition operation to generate "gl_fragcolor" has an instruction attribute of "iadd12," indicating a twelve-bit addition operation. As shown, a node is added with an instruction attribute "i24×12" to cast an output of the reflect sub-graph 620 having a (?,0,24) numeric attribute to a (+,0,12) numeric attribute for computing the "diffuse" term. An executable for performing the fragment shader program may be generated based on the instruction attribute of each node and &tallow indicated by sub-graph 614. Integer (fixed-point) instructions are shown here as staring with an "i". Instructions that perform a casting operation on an output include an "x" after an arithmetic operation label, such as the power instruction "ipowx24," configured to perform a power operation on twenty-four bit inputs, while generating a twelve bit output. The "lsh" instruction within the reflect sub-graph 620 indicates a left-shift operation selected to perform a multiply by two function on a signed twenty-four bit vec3 input. In one embodiment, each node that operates on a vector generates multiple executable instructions, one for each element of the vector. In an alternate embodiment each node that operates on a vector generates a single vector instruction.

FIG. 6E illustrates a sub-graph 630 for light distance computation and light normal computation associated with the fragment shader program of FIG. 6A after propagation rules are applied, in accordance with one embodiment. As shown, "light_position" and "position" terms associated with the fragment shader program are received as inputs, each comprising a vec3 with elements defined to be signed, arbitrary dynamic range, twenty-four bit numeric resolution values. The term "light_vec," as well as subsequent terms associated with corresponding edges leading to, but not including "light_normal" are identically defined. The term "light_normal" is the output of a normalize operation, which computes a vector with magnitude in the range from 0.0 to 1.0 by definition. While most of sub-graph 630 needs to be computed with full dynamic range and full numeric resolution, the output term "light_normal" may be represented as a twenty-four bit integer. In one embodiment, a named function, such as the normalize function invoked in statement 3, may include numeric attributes for function inputs, outputs, or any combination thereof that provide predefined attributes for associated edges. In certain embodiments, predefined attributes for certain edges may be explicitly declared in input code. The input code may define a certain input, output, or intermediate value to have certain dynamic range, numeric resolution, or any other technically feasible attribute.

FIG. 6F illustrates a sub-graph 632 comprising the sub-graph 630 of FIG. 6E with operations assigned for each node, in accordance with one embodiment. As shown, each node up to, but not including one output node is assigned a floating-point instruction, indicated by a leading "f" in the instruction name. For example, "fmul32" indicates a multiply configured to operate on a thirty-two bit floating-point type and output a thirty-two bit floating-point type. Similarly, "fadd32" indicates a floating-point addition, "frecip32" indicates a floating-point reciprocal, "fsqrt32" indicates a floating-point square-root instruction. Floating-point multiply instructions are selected to implement the square operator of sub-graph 630. The output node is assigned a casting-arithmetic instruction, "fmul32×i24" configured to perform a floating-point multiple and a floating-point to twenty-four bit integer casting operator.

FIG. 6G is a table illustrating relative power consumption of floating-point operations and corresponding integer operations associated with the fragment shader program of FIG. 6A, in accordance with one embodiment.

As shown, the table lists a total number of floating-point operations under "Floating-Point Operations" associated with computing each output of gl_fragcolor. A total of thirty eight floating-point multiplies (F*), twenty one floating-point additions (F+), two floating-point reciprocals (FR), one floating-point square root, and one floating-point power function (POW) are performed conventionally using pure floating-point arithmetic throughout the fragment shader program. Energy per operation (Eop) for each floating-point multiply is approximately nine units of energy and each floating-point addition consumes approximately eight units of energy. Total energy for generating each gl_fragcolor output is approximately five hundred and ten units of energy, comprising three hundred and forty two units of energy for performing floating-point multiplication and one hundred and sixty eight units of energy for performing floating-point addition. By transforming ten floating-point multiplication operations, within statement seven of FIG. 6A, to corresponding twenty-four-bit integer multiplication operations (124*), approximately fifty units of energy may be saved. Similarly, approximately one hundred and seventy six units of energy may be saved by transforming a total of twenty-two multiplication statements associated with statements five, six, seven, and nine to corresponding twelve-bit integer multiplication operations. In total, three hundred and forty seven units of energy may be saved from a total of five hundred and ten units of energy required by multiplication and addition operations performed in conjunction with generating each gl_fragcolor output.

Figure 6H:
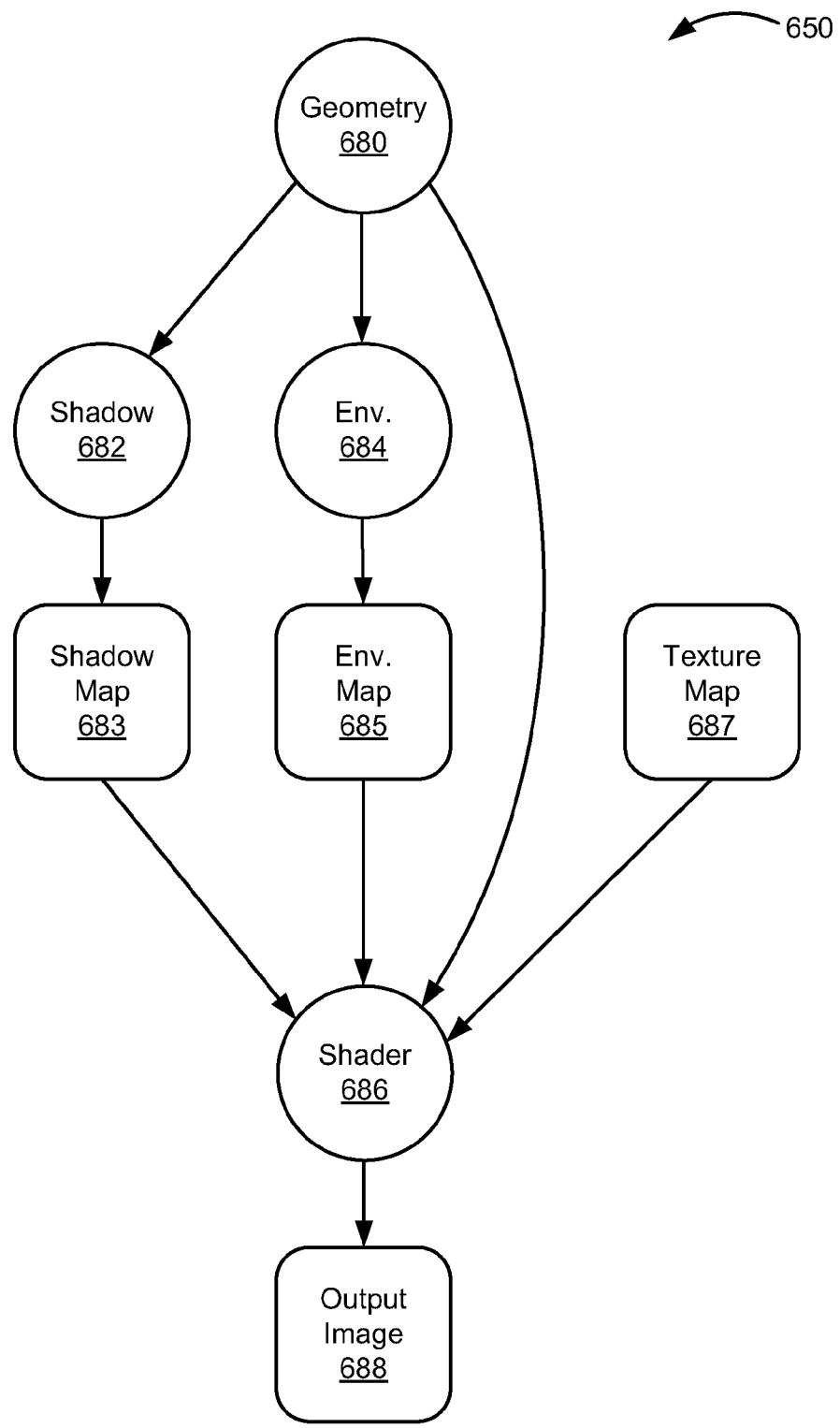
FIG. 6H illustrates a data flow graph for an exemplary shader program comprising shadow mapping, environment mapping, and texture mapping operations, in accordance with one embodiment.

FIG. 6H illustrates a data flow graph 650 for an exemplary graphics pipeline comprising shadow mapping, environment mapping, and texture mapping operations, in accordance with one embodiment. A graphics program configured to implement the graphics pipeline begins by generating geometry information associated with a geometry node 680. The geometry information is transmitted to a shadow-mapping rendering pass, indicated as shadow node 682, configured to generate a shadow map 683. Geometry information is also transmitted to an environment-mapping rendering pass, indicated as environment (Env) node 684, configured to generate an environment map 685. A final rendering pass is implemented by shader node 686, which is configured to generate an output image 688, based on the shadow map 683, the environment map 685, and a texture map 687, as well as the input geometry. The required numeric resolution of the shadow map 683 and the required numeric resolution of the environment map 685 may be different, and are each based on both the required numeric resolution of the output image 688 and on specific calculations performed within the shader program 686.

In one embodiment, numeric attributes are propagated between and among different rendering passes or resulting data sets. For example, numeric attributes for output image 688 may be propagated through rendering pass 686, and further propagated to shadow map 683 and environment map 685, and further propagated to the shadow map rendering pass 682, Environment map rendering pass 684, and finally geometry node 680. Method 100 may be applied recursively over data flow graph 650 and each rendering pass associated with nodes comprising data flow graph 650. In another embodiment, the programmer may explicitly declare the attributes for the output of each rendering pass. For example, a shadow map typically is a binary representation (+,0,1). With respect to a given light source a fragment is either in shadow or it isn't. Thus the programmer can declare the required range and precision for the shadow map.

Figure 7:
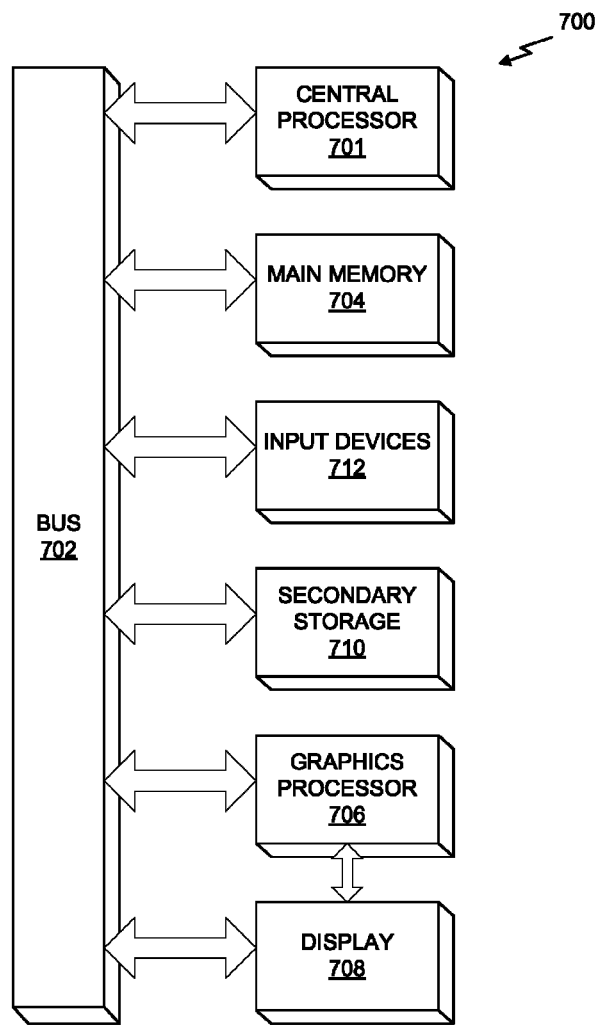
FIG. 7 illustrates an exemplary system in which the various architecture and/or functionality of the various previous embodiments may be implemented.

In one embodiment, the compiler of FIG. 1A is configured to execute on central processor 701 of FIG. 7 and to generate a shader program for execution on graphics processor 706, configured to implement a parallel processing unit 200 of FIG. 2. The shader program may comprise casting instructions, casting-arithmetic instructions, integer instructions, or any combination thereof. The shader program may also comprise floating-point instructions.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704, which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 704 and/or the secondary storage 710. Such computer programs, when executed, enable the system 700 to perform various functions. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a processor, input code including ordered programming statements within memory;
   generating, by the processor, an initial graph representation of arithmetic operations specified by the ordered programming statements, wherein the initial graph representation includes nodes corresponding to the arithmetic operations and edges corresponding to data flow between the nodes;
   annotating, by the processor, at least a first portion of the edges of the initial graph representation with predefined attributes describing requirements related to the corresponding data flow to produce, by the processor, a partially annotated graph representation;
   applying, by the processor, a set of propagation rules to each node within the partially annotated graph representation to update attributes of at least a second portion of the edges of the partially annotated graph representation describing requirements related to the corresponding data flow and to produce, by the processor, a fully annotated graph representation;
   for each edge within the fully annotated graph representation, selecting, by the processor, numerical types for the edge based on the attributes of the edge describing the requirements related to the corresponding data flow to produce a transformed graph representation; and
   generating, by the processor, output code based on the transformed graph representation.

2. The method of claim 1, wherein applying the set of propagation rules comprises:
   selecting a node within a current annotated graph representation;
   selecting a propagation rule from the set of propagation rules; and
   upon determining that the selected propagation rule matches attributes associated with the selected node, updating the current annotated graph representation according to the selected rule to generate an updated graph representation.

3. The method of claim 2, wherein the selected node represents an addition operation, and wherein the set of propagation rules includes a rule for propagating output dynamic range associated with an output edge of the selected node within the current annotated graph representation to input edges of a corresponding node within the updated graph representation.

4. The method of claim 2, wherein the selected node represents an addition operation, and wherein the set of propagation rules includes a rule for propagating output precision associated with an output edge of the selected node within the current annotated graph representation to input edges of a corresponding node within the updated graph representation.

5. The method of claim 2, wherein the selected node represents an addition operation, and wherein the set of propagation rules includes a rule for propagating input dynamic range associated with input edges of the selected node within the current annotated graph representation to an output edge of a corresponding node within the updated graph representation.

6. The method of claim 2, wherein the selected node represents an addition operation, and wherein the set of propagation rules includes a rule for propagating input precision associated with input edges of the selected node within the current annotated graph representation to an output edge of a corresponding node within the updated graph representation.

7. The method of claim 2, wherein the selected node represents a multiplication operation, and wherein the set of propagation rules includes a rule for propagating output precision associated with an output edge of the selected node within the current annotated graph representation to input edges of a corresponding node within the updated graph representation.

8. The method of claim 2, wherein the selected node represents a multiplication operation, and wherein the set of propagation rules includes a rule for propagating output dynamic range associated with an output edge of the selected node within the current annotated graph representation to input edges of a corresponding node within the updated graph representation.

9. The method of claim 2, wherein the selected node represents a multiplication operation, and wherein the set of propagation rules includes a rule for propagating input dynamic range associated with input edges of the selected node within the current annotated graph representation to an output edge of a corresponding node within the updated graph representation.

10. The method of claim 1, wherein the initial graph representation comprises an abstract syntax tree.

11. The method of claim 1, wherein the initial graph representation comprises a data flow graph.

12. The method of claim 1, wherein the output code comprises at least one casting-arithmetic instruction.

13. The method of claim 12, wherein the casting-arithmetic instruction performs a floating-point arithmetic operation and casts a floating-point result to a fixed-point format.

14. The method of claim 12, wherein the casting-arithmetic instruction performs a casting operation on at least one input value.

15. The method of claim 1, wherein the predefined attributes comprise type attributes of the initial graph representation.

16. The method of claim 15, wherein the predefined attributes are inferred based on association with a specified function.

17. The method of claim 16, wherein the specified function is a normalize function.

18. The method of claim 16, wherein the predefined attributes are declared explicitly within the input code.

19. A non-transitory computer-readable storage medium storing instructions that, when executed by a processor, cause the processor to perform steps comprising:
   identifying input code including ordered programming statements within memory;
   generating an initial graph representation of arithmetic operations specified by the ordered programming statements, wherein the initial graph representation includes nodes corresponding to the arithmetic operations and edges corresponding to data flow between the nodes;

annotating at least a first portion of the edges of the initial graph representation with predefined attributes describing requirements related to the corresponding data flow to produce a partially annotated graph representation;

applying a set of propagation rules to each node within the partially annotated graph representation to update attributes of at least a second portion of the edges of the partially annotated graph representation describing requirements related to the corresponding data flow and to produce a fully annotated graph representation;

for each edge within the fully annotated graph representation, selecting numerical types for the edge based on the attributes of the edge describing the requirements related to the corresponding data flow to produce a transformed graph representation; and generating output code based on the transformed graph representation.

20. A system comprising:

a memory configured to store input code comprising ordered programming statements; and a processor coupled to the memory and configured to:

identify, input code including ordered programming statements within memory;

generate an initial graph representation of arithmetic operations specified by the ordered programming statements, wherein the initial graph representation includes nodes corresponding to the arithmetic operations and edges corresponding to data flow between the nodes;

annotate at least a first portion of the edges of the initial graph representation with predefined attributes describing requirements related to the corresponding data flow to produce a partially annotated graph representation;

apply a set of propagation rules to each node within the partially annotated graph representation to update attributes of at least a second portion of the edges of the partially annotated graph representation describing requirements related to the corresponding data flow and to produce a fully annotated graph representation;

for each edge within the fully annotated graph representation, select numerical types for the edge based on the attributes of the edge describing the requirements related to the corresponding data flow to produce a transformed graph representation; and generate output code based on the transformed graph representation.

* * * * *